US012560176B1

(12) United States Patent
Yin et al.

(10) Patent No.: US 12,560,176 B1
(45) Date of Patent: Feb. 24, 2026

(54) EXTENDED WHEEL TIP AND BACK-DISK CAVITY

(71) Applicant: Garrett Transportation I Inc., Torrance, CA (US)

(72) Inventors: Junfei Yin, Bedford (GB); Daniel Zhang, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 19/034,779

(22) Filed: Jan. 23, 2025

(51) Int. Cl.

| | |
|---|---|
| ***F04D 29/28*** | (2006.01) |
| ***F04D 29/22*** | (2006.01) |
| ***F04D 29/30*** | (2006.01) |
| *F02B 37/00* | (2006.01) |

(52) U.S. Cl.
CPC ....... *F04D 29/284* (2013.01); *F04D 29/2266* (2013.01); *F04D 29/30* (2013.01); *F02B 37/00* (2013.01); *F05D 2220/20* (2013.01)

(58) Field of Classification Search
CPC .. F04D 29/2266; F04D 29/162; F04D 29/442; F04D 29/284; F01D 3/04; F05D 2250/52
See application file for complete search history.

(56) References Cited

U.S. PATENT DOCUMENTS

| | | | | |
|---|---|---|---|---|
| 3,460,748 A * | 8/1969 | Erwin | F04D 29/442 415/181 |
| 11,885,350 B2 * | 1/2024 | Rusch | F04D 29/444 |
| 2015/0330240 A1 * | 11/2015 | Kelly | F02B 39/14 415/110 |
| 2016/0017791 A1 * | 1/2016 | Nakao | F04D 29/685 415/203 |
| 2023/0258197 A1 * | 8/2023 | Iwakiri | F04D 29/30 415/203 |
| 2024/0240647 A1 * | 7/2024 | Kanzaka | F04D 29/30 |

FOREIGN PATENT DOCUMENTS

WO WO-2020040774 A1 * 2/2020 ........... F04D 29/441

* cited by examiner

*Primary Examiner* — Eldon T Brockman
(74) *Attorney, Agent, or Firm* — BelayIP

(57) ABSTRACT

A compressor having a housing along with a wheel including a hub and a plurality of impellers defining flow channels is disclosed. The hub forms a flow surface that defines a concave surface-curve from an inducer end to an inflection point, and a convex surface from the inflection point to an exducer end of the flow surface. The hub forms a back-disk surface including a circumferential edge-channel inset from and surrounding a central portion. The housing includes a conical inner-diffuser wall surrounding a circular inset wall. The central portion of the back-disk surface is received by the conical inner-diffuser wall, while the exducer end of the flow surface extends radially outward to be axially over an inner portion of the inner-diffuser wall.

19 Claims, 5 Drawing Sheets

EXTENDED WHEEL TIP AND BACK-DISK CAVITY

BACKGROUND OF THE INVENTION

1. Field of the Invention

The present invention relates to a centrifugal compressor, and more particularly, to a centrifugal compressor wheel having an extended wheel tip and a related compressor housing having an extended back-disk cavity.

2. Description of Related Art

With reference to FIG. 1, a typical prior art turbocharger 101 includes a radial turbine and a centrifugal compressor. The turbocharger 101 includes a turbocharger housing and a rotor configured to rotate within the turbocharger housing along an axis-of-rotation 103 on thrust bearings and two sets of journal bearings (one for each respective rotor wheel), or alternatively, other similarly supportive bearings. The turbocharger housing can include a turbine housing 105, a compressor housing 107, and a bearing housing 109 (i.e., a center housing that contains the bearings) that connects the turbine housing to the compressor housing. The rotor includes a turbine wheel 111 located substantially within the turbine housing, a compressor wheel 113 located substantially within the compressor housing, and a shaft 115 extending along the axis-of-rotation, through the bearing housing, to connect the turbine wheel to the compressor wheel.

The turbine housing 105 and turbine wheel 111 form the turbine, which is configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis-of-rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form the centrifugal compressor, which is configured to transfer mechanical energy to a fluid stream to achieve an increased total energy level of the fluid. The compressor wheel, being driven in rotation by the exhaust-gas driven turbine wheel 111, is configured to compress an axially received input of the fluid stream (e.g., ambient air 131, or already-pressurized air from a previous-stage in a multi-stage compressor) into a pressurized fluid stream (e.g., pressurized air stream 133) that is ejected circumferentially from the compressor. Due to the compression process, the pressurized fluid stream is characterized by an increased temperature over that of the input.

Optionally, the pressurized fluid stream may be channeled through a convectively cooled charge air cooler 135 configured to dissipate heat from the pressurized fluid stream, increasing its density. A resulting cooled and pressurized output fluid stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

With reference to FIGS. 1-3, the compressor wheel 113 forms a hub 161 and a plurality of impellers 163. The hub 161 defines the location of the axis-of-rotation 103 with respect to the compressor wheel 113, and the compressor wheel is typically rotationally symmetric around the axis-of-rotation.

The hub forms two surfaces on opposite sides and facing in axially opposite directions, a flow surface 165, and a back-disk surface 167. The flow surface 165 extends from an inducer end 169 at an inducer, to an exducer end 171 that is at an exducer defined by a downstream end of the plurality of impellers 163. Both the inducer end 169 and the exducer end 171 of the flow surface 165 are circular, in that they each extend concentrically around the axis-of-rotation 103. The exducer end 171 of the flow surface 165 establishes an outer diameter of the hub 161. The flow surface 165, taken meridionally, (i.e., projected into a cross-section by a plane equally bisecting the hub, the axis-of-rotation being in the pane), defines a concave surface-curve from a substantially radially-downstream-facing portion (with respect to the exducer) at the inducer end 169 of the flow surface 165, to a substantially axially-upstream-facing portion (with respect to the inducer) at the exducer end 171 of the flow surface.

The back-disk surface 167 faces in a substantially axially-downstream-facing direction (with respect to the inducer), which is the axially opposite direction from that which the flow surface 165 faces at the exducer. At a radially outer edge, the back-disk surface 167 connects to the exducer end 171 of the flow surface 165 across an outer cylindrical surface 173.

The impellers are formed as blades extending normal to the flow surface 165 on a conically curved wall of the hub 161. They form spiraling impeller passageways between the flow surface and a shroud surface 185 of the compressor housing 107, each impeller passageway leading from the inducer to the exducer. Spinning around the axis-of-rotation 103, the impellers 163 draw the fluid stream (the ambient air 131) axially into the inducer of the compressor wheel 113, and then drive it radially out of the exducer. From the exducer, the fluid stream passes radially and circumferentially into a diffuser 187, which diffuses the fluid stream into a scroll 189, that in turn turns the flow and directs it as the pressurized air stream 133.

As shown in FIGS. 2 and 3, the compressor housing 107 forms a compressor wall having several relatively concentric portions. Those portions include a circular inset wall 191 concentrically surrounding the axis-of-rotation 103, an inner-diffuser wall 193 concentrically surrounding the circular inset wall, and an outer-diffuser wall 195 concentrically surrounding the inner-diffuser wall (circled portion 197 magnified in FIG. 3).

The circular inset wall 191 is concentric with the axis-of-rotation 103, and is sized to be larger than the outer diameter of the hub 161. The circular inset wall 191 concentrically receives (i.e., mates with) the back-disk surface 167 of the compressor hub with a back-disk clearance gap to avoid radial and axial contact with the hub as the compressor wheel rotates within the housing. The back-disk clearance gap establishes a cavity between the circular inset wall 191 of the compressor wall and the hub 161. The hub 161 extends out of the circular inset wall 191 such that the exducer end 171 of the flow surface, while radially within the circular inset wall 165, is not axially within the circular inset wall.

The inner-diffuser wall 193 forms a conical surface inset into the compressor wall. It surrounds the circular inset wall 191, and is concentric with the axis-of-rotation 103. The conical configuration of the inner-diffuser wall 193 axially connects the circular inset wall 191 with the outer-diffuser wall 195 such that the outer-diffuser wall axially aligns with the exducer end 171 of the flow surface 165.

In its transition from the impeller passageways into the diffuser 187, the fluid stream flows past the exducer end 171 and through the exducer. After departing the spinning compressor wheel 113, the fluid expands across and outer end of the back-disk clearance gap to reach the static inner-diffuser wall 193 of the compressor housing 107. In its transition between the rotating impeller passageways and the static diffuser wall, the fluid experiences significant turbulence, which dissipates some of the total energy imparted to the fluid stream by the plurality of impellers 163. The inner-diffuser wall 193 forms one side of the start of a diffuser passageway into the scroll 189, which directs the fluid stream out of the compressor. The diffuser passageway starts off wide just downstream of the exducer, and conically narrows in a downstream direction to reach the outer-diffuser wall 195 to limit the dissipation of energy in the transition from the impeller passageways to the scroll 189.

There exists a need to improve on the transition of the fluid stream between the rotating impeller passageways and the static diffuser wall, thereby reducing the dissipation of the energy imparted by the compressor. Preferred embodiments of the present invention satisfy these and other needs, and provide further related advantages.

BRIEF SUMMARY OF THE INVENTION

In various embodiments, the present invention may solve some or all of the needs mentioned above, providing a compressor wheel and/or a compressor that improves on the transition of a fluid stream passing between rotating impeller passageways and a static diffuser wall, thereby reducing the dissipation of the energy imparted by the compressor.

The compressor comprises a housing, and also a compressor wheel including a hub and a plurality of impellers. The plurality of impellers defines a plurality of flow channels, each of which is defined by a pair of consecutively positioned impellers. The hub defines an axis-of-rotation, and forms a flow surface extending from an inducer end to an exducer end of the flow surface. The flow surface, taken meridionally, defines a surface-curve from the inducer end to the exducer end of the flow surface.

The surface-curve establishes a concave curvature from the inducer end to an inflection point, and smoothly transitions from the concave curvature to a convex or non-concave curvature at the inflection point. The convex or non-concave curvature extends from the inflection point to the exducer end. Advantageously, compressor wheels with various combinations of these features are believed to reduce turbulence, and thereby increased static pressure at a diffuser exit. Moreover, this reduces the radial velocity while approximately maintaining the tangential velocity.

In another feature of the invention, the hub also forms a back-disk surface that includes a central portion, and a circumferential edge-channel inset from, and concentrically surrounding, the central portion. The housing is configured with a conical inner-diffuser wall concentrically surrounding a circular inset wall. The central portion of the back-disk surface is received by the conical inner-diffuser wall, while the exducer end of the flow surface extends radially outward to be axially over an inner portion of the inner-diffuser wall. Advantageously, combinations of these features are believed to further reduce turbulence, and thereby increased static pressure at a diffuser exit. Moreover, this reduces the radial velocity while approximately maintaining the tangential velocity.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure.

In the following, an advantageous embodiment of the invention is explained with reference to the accompanying figures, wherein.

DETAILED DESCRIPTION OF THE PREFERRED EMBODIMENTS

Figure 1:
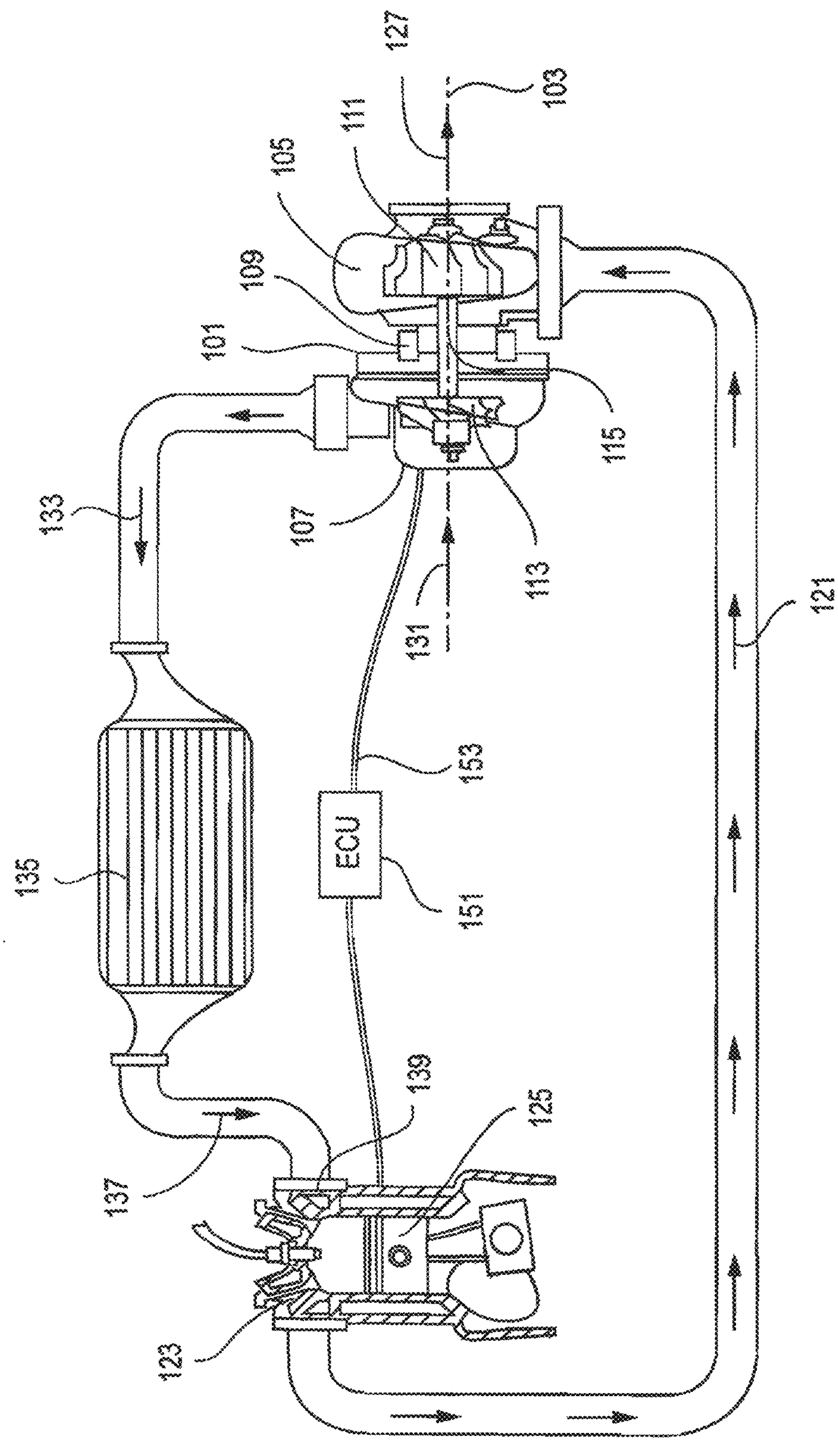
FIG. 1 (PRIOR ART)
FIG. 1 is a system view of a prior art turbocharged internal combustion engine.

As used throughout the present disclosure, unless specifically stated otherwise, the term “or” encompasses all possible combinations, except where infeasible. For example, the expression “A or B” shall mean A alone, B alone, or A and B together. If it is stated that a component includes “A, B, or C”, then, unless specifically stated otherwise or infeasible, the component may include A, or B, or C, or A and B, or A and C, or B and C, or A and B and C. Expressions such as “at least one of” do not necessarily modify an entirety of the following list and do not necessarily modify each member of the list, such that “at least one of “A, B, and C” should be understood as including only one of A, only one of B, only one of C, or any combination of A, B, and C.

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

As described and/or used herein: 1) when one or more components are described as being connected, joined, affixed, coupled, attached, or otherwise interconnected, such interconnection can be direct as between the components, or can be indirect such as through the use of one or more intermediary components; 2) reference to a "member," "component," or "portion" shall not be limited to a single structural member, component, or element but can include an assembly of components, members, or elements; 3) the terms "substantially" and "about" are defined as at least close to (and includes) a given value or state (preferably within 10% of, more preferably within 1% of, and most preferably within 0.1% of; 4) the term functionally greater is defined herein as being greater than, by an amount that causes a change in the functional mass-flow-rate, that amount being of measurable significance as compared to the amounts caused by dimensional variations within the manufacturing tolerances of the wheel; and 5) an image described as a meridionally projected image depicts an object rotationally projected onto a plane of the figure, e.g., a meridian plane through the point of projection.

Typical embodiments of the present invention reside in devices incorporating a centrifugal compressor that is configured to operate over a range of pressure ratios while operating across a range of fluid flow rates (e.g., air flow rates). Such devices might include various vehicle systems such as internal combustion engine turbochargers and electric vehicle cooling systems.

Compressors can be characterized by a range of performance levels over a range of operating conditions. This may be graphically depicted on a compressor map, which plots the compressor pressure ratio against the corrected mass flow levels for a range of design operating conditions. The compressor map defines a surge line and a choke line, which correspond to the varying extreme operating conditions at which the compressor will experience surge (i.e., at which significant intermittent backflow of fluid through the compressor will occur), and choke. Typically, compressor designs providing for a wider range of operating conditions prior to experiencing surge and choke are considered preferable.

With reference to FIGS. 4-7, in a compressor stage forming an embodiment of a centrifugal compressor embodying the invention, a compressor includes a compressor housing 207, and a rotor. The rotor includes a compressor wheel 213 located substantially within the compressor housing 207, on a shaft 215. The housing is configured to mount the compressor wheel on thrust bearings and journal bearings, or on other similarly supportive bearings, for rotation within the housing and around an axis-of-rotation 203. The rotor is configured to rotate within the compressor housing along the axis-of-rotation 203.

The compressor wheel 213 and compressor housing 207 of the compressor stage are configured such that when the compressor wheel rotates within the compressor housing, around the axis-of-rotation 203, it drives axially received input air downstream, transferring mechanical energy to the fluid stream, and thereby compressing the input air into a pressurized air stream that has a higher total pressure than the axially received input air.

The compressor wheel 213 forms a hub 261 and a plurality of impellers 263. The hub 261 defines the location of the axis-of-rotation 203 with respect to the compressor wheel 213, and the compressor wheel is typically rotationally symmetric around the axis-of-rotation.

The hub forms two surfaces on opposite sides of the hub, the two surfaces facing in axially opposite directions along the axis-of-rotation. The two surfaces are a flow surface 265 facing in a first, axially-upstream direction (with respect to the inducer), and a back-disk surface 267 facing in a second, axially-downstream direction. The flow surface 265 extends from an inducer end 269 of the flow surface, which is at an inducer of the compressor wheel 213. The flow surface 265 extends to an exducer end 271 of the flow surface, which can be at, or substantially near (with respect to the length of the flow surface), an exducer of the compressor wheel 213 (i.e., an area through which the trailing edges of the impellers rotate, and thus through which the fluid flow leaves the impellers). As depicted, the exducer end 271 is a limited distance past (with respect to the length of the flow surface) the exducer of the compressor wheel 213. Both the inducer end 269 and the exducer end 271 of the flow surface 265 are circular, in that they each extend concentrically around the axis-of-rotation 203. The exducer end 271 of the flow surface establishes an outer diameter of the hub 261.

The flow surface 265, taken meridionally, (i.e., projected into a cross-section by a plane equally bisecting the hub, the axis-of-rotation being in the pane), defines a surface-curve. The surface-curve extends from a substantially radially-downstream-facing portion (with respect to the exducer) proximate to the inducer end 269 of the flow surface 265, to a substantially axially-upstream-facing portion (with respect to the inducer) proximate to the exducer end 271 of the flow surface.

The surface-curve establishes a concave curvature from the inducer end 269 of the flow surface to an inflection point 273. At the inflection point, the surface-curve transitions smoothly to a non-concave curvature, and typically a convex curvature, from the inflection point to the exducer end 271. Thus, the exducer end 271 is at a greater diameter than the inflection point 273, both of which are typically greater than or equal to 1.00 inch. For the purposes of this application, the transition is smooth in that its slope is a continuous function at the relevant location (e.g., the inflection point). Optionally, the transition may also be smooth in that it's acceleration (the derivative of its slope) is a continuous function at the relevant location.

The back-disk surface 267 faces in an axially-downstream-facing direction (with respect to the inducer), which is substantially the axially opposite direction from that which the flow surface 265 faces at the exducer. The back-disk surface 267 includes a central portion 275 that is rotationally symmetric and concentric with respect to the axis-of-rotation 203, and a circumferential edge-channel (i.e., a channel that is open to an edge on one side of the channel, thereby approximating a router rabbet/rebate cut on the open edge) inset from, and concentrically surrounding, the central portion.

Figure 3:
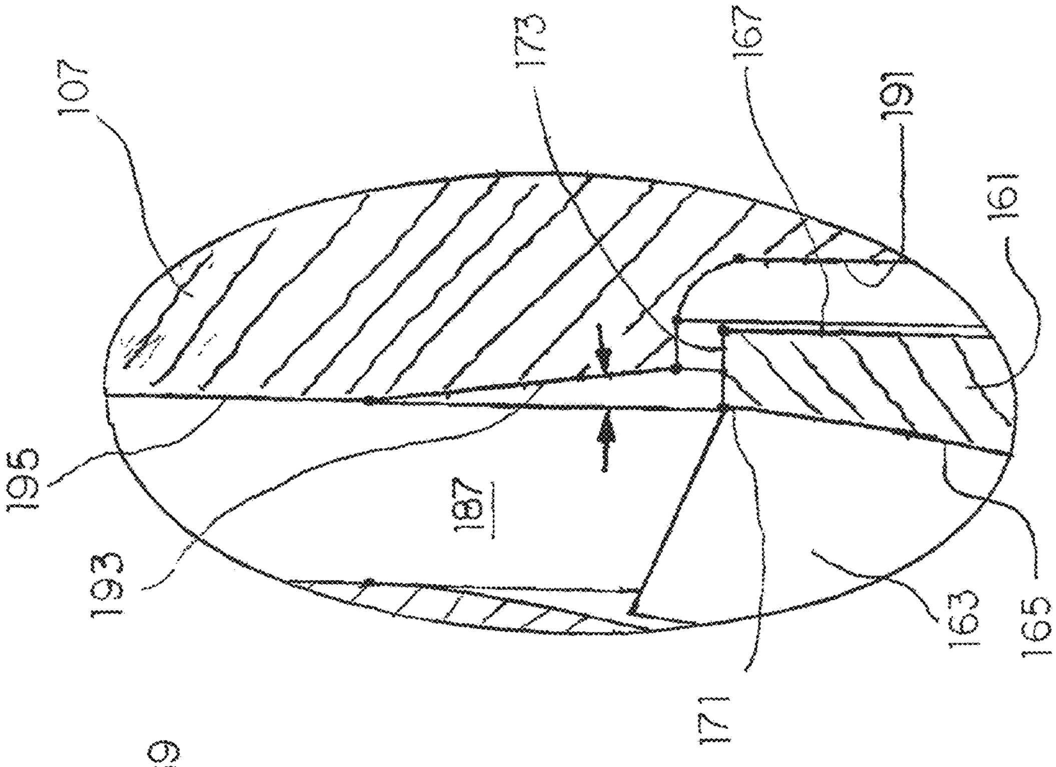
FIG. 3 (PRIOR ART)
FIG. 3 is a detail view of the portion of a compressor depicted in FIG. 2, taken along oval A of FIG. 2.

The edge-channel has a conical bottom 277 and a smoothly transitioning side wall 279. The conical bottom 277 forms an edge-channel conical surface, the edge-channel conical surface being characterized by an edge-channel conical angle β, which is greater than or equal to 0°. The conical bottom 277 connects the exducer end 271 of the flow surface 265 to the side wall 279. Typically, the conical bottom 277 connects to the exducer end 271 at a tip 280, which can be radially pointed (within manufacturing tolerances) at the exducer end (see, e.g., FIG. 7). Alternatively, the conical bottom 277 can connect to the exducer end 271 at the tip 280, which forms an (outward facing) outer cylindrical surface similar to the outer cylindrical surface 173 described above and depicted in FIG. 3 (see, e.g., FIGS. 5 & 6). This outer cylindrical surface of the tip 280 might optionally be expected to have an axial width of 0.0 mm and 1.0 mm, wherein a 0.0 mm width forms the radially pointed tip described above.

The side wall 279, using concave and convex curvatures, smoothly transitions and connects the conical bottom 277 to an outer edge of the central portion 275. Thus, the exducer end 271 is at a greater diameter than the outer edge of the central portion 275, and typically at a greater diameter than the inflection point 273. Optionally, the side wall 279 can form an (outward-facing) inner cylindrical surface 281 in the connection to the outer edge of the central portion 275. This inner cylindrical surface 281 might optionally be expected to have an axial width greater than or equal to 0.5 mm. Relative to the conical bottom 277 of the edge-channel, the central portion 275 of the back-disk forms an axial central-portion protrusion extending in the axially-downstream-facing direction.

The plurality of impellers 263 are formed as blades extending from the flow surface 265 on a conically curved wall of the hub 261. The blades extend normal to the flow surface 265, and are consecutively positioned around the flow surface with respect to the axis-of-rotation 203. Each impeller of the plurality of impellers 263 has a leading edge 282 and a trailing edge 283. The plurality of impellers 263 forms spiraling impeller passageways between the flow surface 265 and a shroud surface 285 of the compressor housing 207, each impeller passageway leading from the inducer to the exducer. Spinning around the axis-of-rotation 203, the plurality of impellers 263 draws the fluid stream (e.g., ambient air) axially into the inducer of the compressor wheel 213, and then impels it radially out of the exducer. From the exducer, the fluid stream passes radially and circumferentially into a diffuser 287, which diffuses the fluid stream into a scroll 289, that in turn turns the flow and directs it as a pressurized fluid stream.

Figure 4:
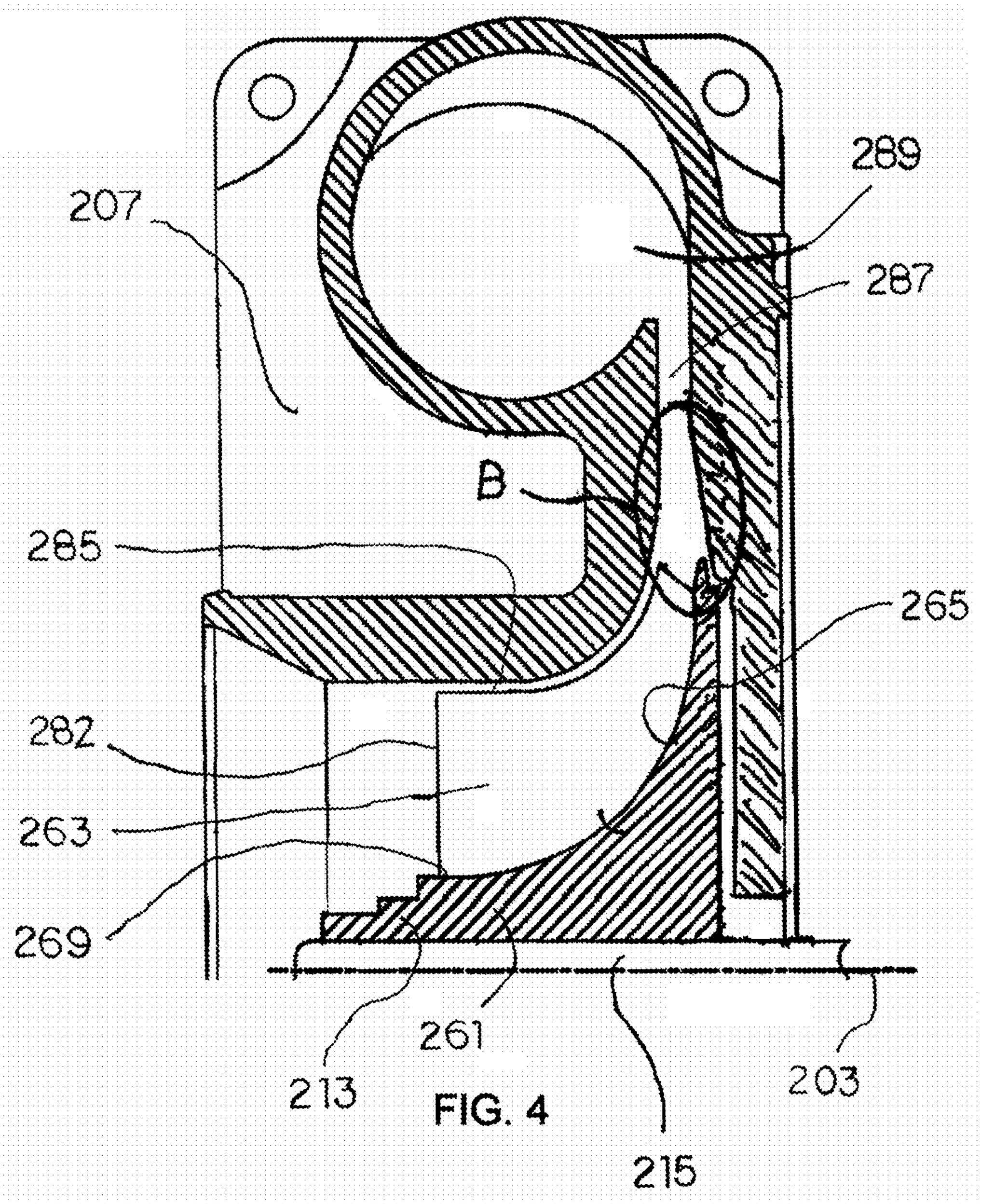
FIG. 4 is a cross-sectional plan view, with a meridionally projected blade, of a portion of a compressor of a turbocharger embodying the invention.
Figure 5:
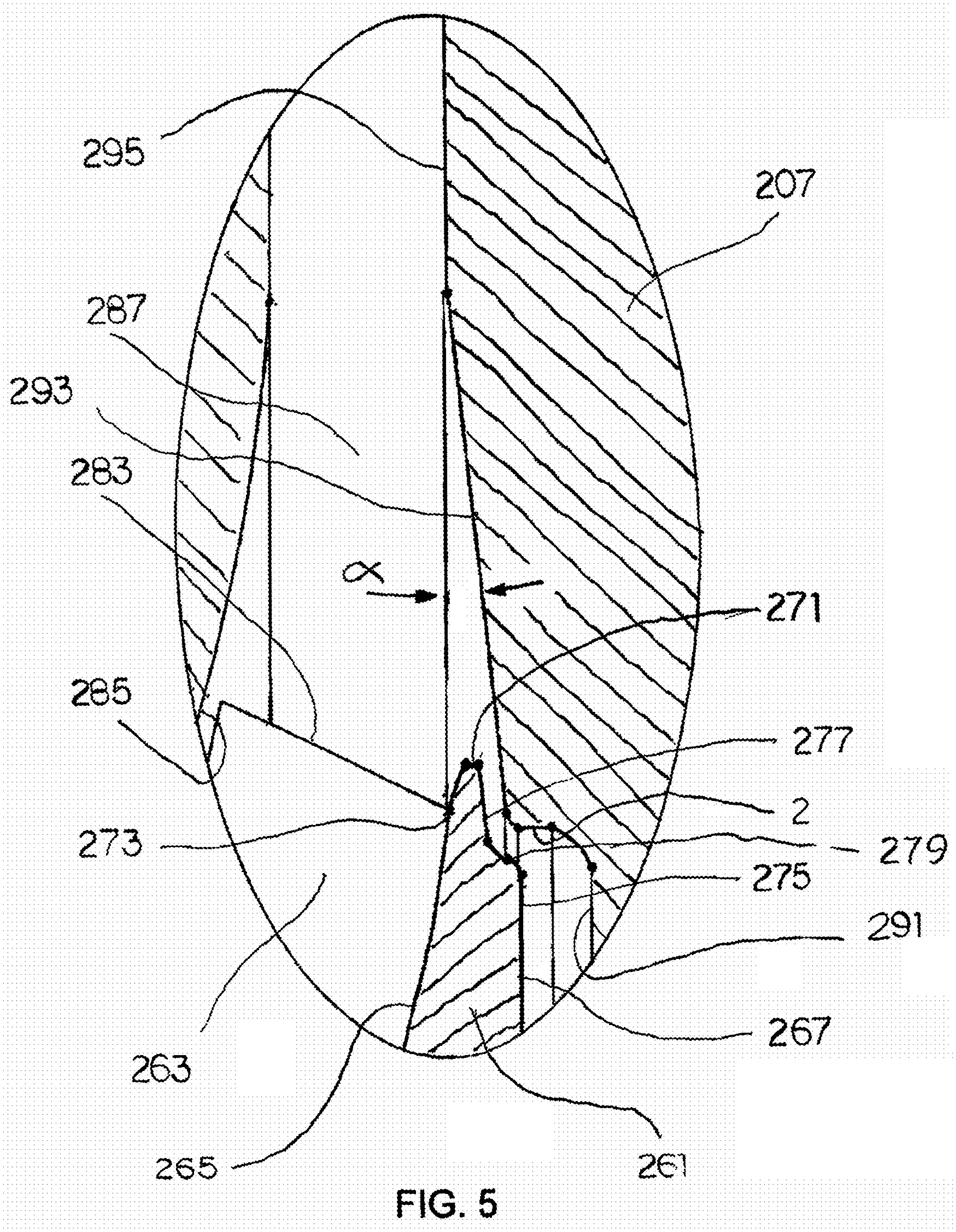
FIG. 5 is a detailed view of a first variation of a portion of the compressor depicted in FIG. 4, taken along oval B of FIG. 4.
Figure 7:
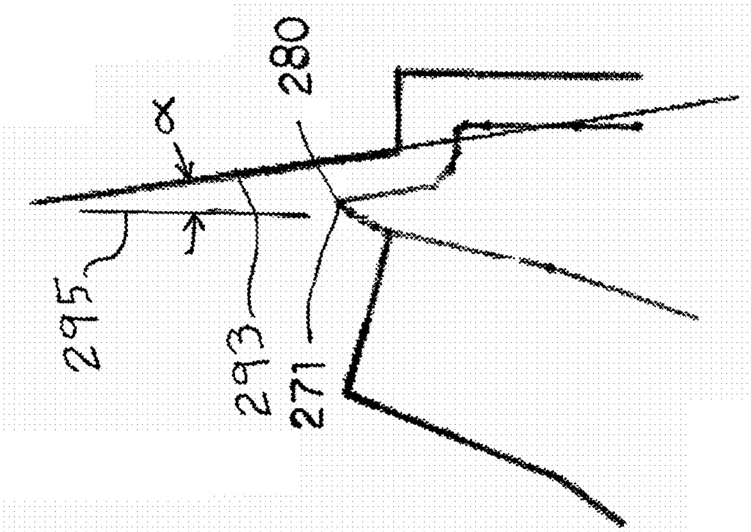
FIG. 7 is a conceptual sketch of a third variation of the portion of the compressor depicted in FIG. 5. The same numbering is used in each variation of the embodiment.
Figure 6:
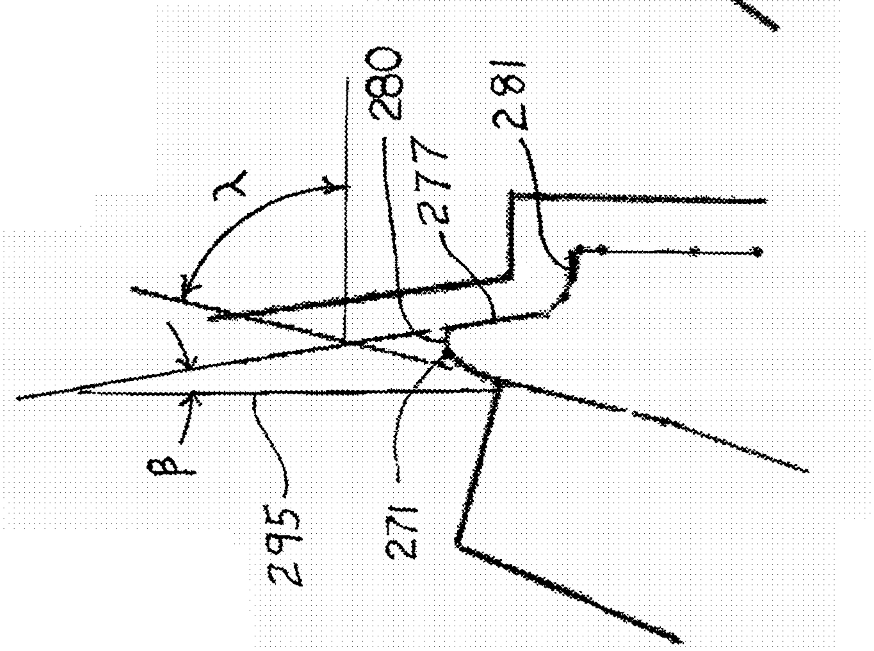
FIG. 6 is a conceptual sketch of a second variation of the portion of the compressor depicted in FIG. 5.

As shown in FIG. 4, the compressor housing 207 forms a compressor wall along a compressor-wall plane that is normal to the axis-of-rotation 203, and through which the axis-of-rotation passes. The compressor wall has several relatively concentric portions. Those portions include a circular inset wall 291 concentrically surrounding the axis-of-rotation 203, an inner-diffuser wall 293 concentrically surrounding the circular inset wall, and an outer-diffuser wall 295 concentrically surrounding the inner-diffuser wall. The outer-diffuser wall 295 lies along the compressor-wall plane, while the inner-diffuser wall 293 and the circular inset wall 291 lie on a side of the compressor-wall plane opposite the side in which the impellers 263 extend (either entirely or primarily). Typically, though not necessarily, the inflection point 273 also lies along the compressor-wall plane.

The circular inset wall 291 forms a saucer-shaped divot that typically is entirely on the same side of the compressor-wall plane as the inner-diffuser wall 293. An outer edge of the circular inset wall 291 connects to the inner-diffuser wall 293, typically through a series of convex and concave curves. Optionally, the circular inset wall 291 can form an inward-facing cylindrical surface 297 in its outer portion that transitions to the inner-diffuser wall 293.

The central-portion protrusion of the compressor wheel 213 is sized to be radially smaller than the circular inset wall 291, such that the circular inset wall is sized to partially receive the central-portion protrusion with the compressor wheel 213 mounted in the compressor housing 207. The circular inset wall 291 concentrically receives (i.e., mates with) the central-portion protrusion of the hub 261 with a central-portion clearance gap therebetween (i.e., between the circular inset wall and the central-portion protrusion) to avoid radial and axial contact with the hub as the compressor wheel 213 rotates within the compressor housing 207. The hub 261 extends out of the circular inset wall 291, allowing the exducer end 271 of the flow surface 265 to extend radially outward past the circular inset wall and over an inner portion of the inner-diffuser wall 293.

The inner-diffuser wall 293 forms a conical surface inset into the compressor wall; the inner-diffuser-wall conical surface being characterized by an inner-diffuser-wall conical angle α, typically being between 0° and 10°. The conical configuration of the inner-diffuser wall 293 extends radially outward and axially upstream to axially and radially connect the circular inset wall 291 to the outer-diffuser wall 295 at the point at which the outer-diffuser wall (and the compressor-wall plane) axially aligns with the inflection point 273 of the flow surface 265.

The inner-diffuser-wall conical angle typically matches the edge-channel conical angle. The edge-channel and the inner portion of the inner-diffuser wall 293 are conformingly spaced apart, with an edge-channel clearance gap. In combination, the central-portion clearance gap and edge-channel clearance gap establishes a cavity between the compressor wall and the hub 261. The cavity is sized (experimentally or analytically) to minimize turbulence, and typically to minimize the leakage of the fluid stream into the cavity. The hub 261 extends out of the circular inset wall 291, allowing the exducer end 271 of the flow surface to protrude radially beyond the circular inset wall 291 and over the conical surface of the inner-diffuser wall 293.

In its transition from the impeller passageways into the diffuser 287, the fluid stream flows along the flow surface 265, radially passing the inflection point 273, and then radially passing the exducer end 271 of the flow surface 265. As it passes across the non-concave, and typically convex, surface-curve on the flow surface from the inflection point 273 to the exducer end 271, the fluid expands and slows in a smooth fashion with minimal turbulence through a space axially outside of the axial bounds of the inflection point 273 and the outer-diffuser wall 295. While passing the inflection point 273, the fluid stream (and the flow surface 265) is characterized by a flow angle λ (relative to the direction of the axis of rotation) that is equal to or less than 90°.

As such, after departing the spinning compressor wheel 213, when the fluid expands across an outer end of the edge-channel clearance gap to reach the static inner-diffuser wall 293 of the compressor housing 207, it is moving more slowly and smoothly than a comparable prior art system. In its transition between the rotating impeller passageways and the static diffuser wall, the fluid experiences significantly reduced turbulence, which dissipates less of the total energy imparted to the fluid stream by the plurality of impellers 263. The inner-diffuser wall 293 forms one side of the start of a diffuser passageway into the scroll 289, which directs the fluid stream out of the compressor. The diffuser passageway starts off wide just downstream of the exducer end 271 of the flow surface 265, and conically narrows in a downstream direction to smoothly reach the outer-diffuser wall 295, limiting the dissipation of energy in the transition from the impeller passageways to the scroll 289.

Figure 2:
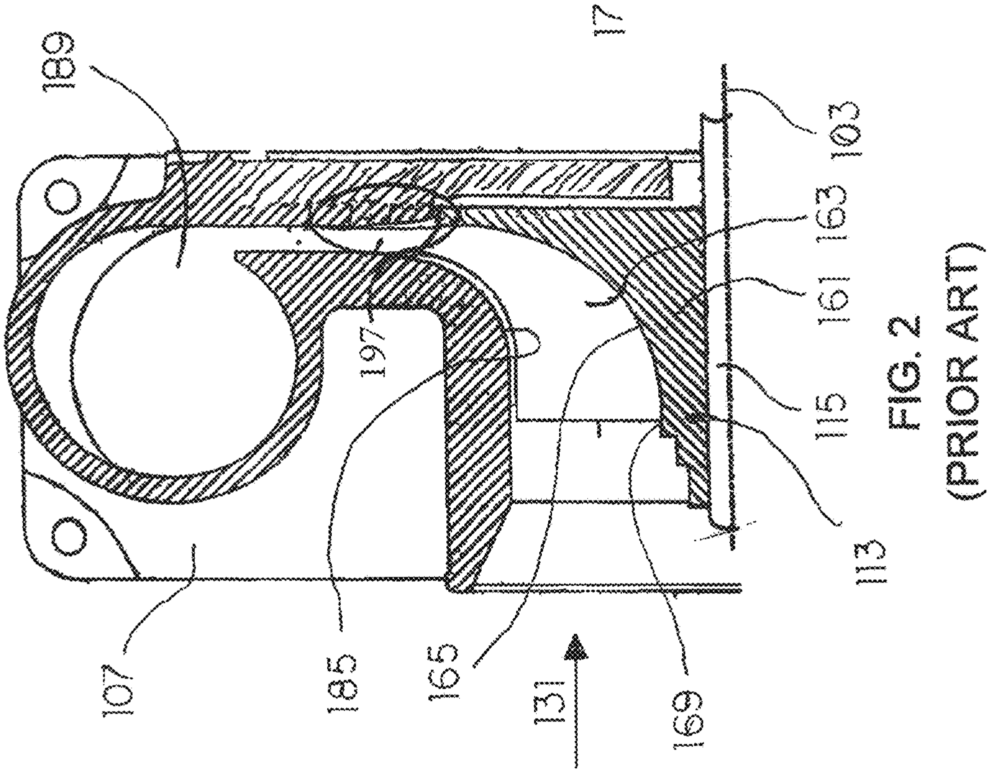
FIG. 2 (PRIOR ART)
FIG. 2 is a cross-sectional plan view, with a meridionally projected blade, of a portion of a compressor of the turbocharger depicted in FIG. 1.

Optionally, the centrifugal compressor of this embodiment can be part of a turbocharger that embodies the invention. This turbocharger includes the centrifugal compressor, and otherwise can be a typical prior-art turbocharger that includes a radial turbine, and optionally, a convectively cooled charge air cooler, as described above with reference to FIGS. 1-3.

It is to be understood that the invention comprises apparatus and methods for designing and for producing a compressor wheel, a turbocharger, and/or a housing for a compressor wheel or a turbocharger, as well as the apparatus of the compressor wheel itself. Moreover, while this invention is described for compressing compressible fluids, compressor wheels for pumping incompressible fluids are within the scope of the invention unless otherwise limited by the claims. In short, the above disclosed features can be combined in a wide variety of configurations within the anticipated scope of the invention.

While particular forms of the invention have been illustrated and described, it will be apparent that various modifications can be made without departing from the spirit and scope of the invention. For example, while the depicted embodiments have purely axial inducers and purely radial exducers, a radial-to-axial centrifugal compressor is clarified and defined herein to include compressors that draw in fluid through a primarily axial-facing inducer, and expel that fluid through a primarily radial-facing exducer. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A compressor wheel configured to compress a fluid, the compressor wheel comprising:

a hub defining an axis-of-rotation, the hub forming a flow surface extending from an inducer end to an exducer end of the flow surface, the flow surface facing in a first axial direction, and the hub forming a back-disk surface facing in a second axial direction opposite the first axial direction, wherein the flow surface, taken meridionally, defines a surface-curve from the inducer end to the exducer end of the flow surface;

a plurality of impellers extending from the flow surface; and wherein the surface-curve establishes a concave curvature from the inducer end to an identifiable inflection point; and wherein the surface-curve smoothly transitions to and establishes a non-concave curvature from the inflection point to the exducer end;

wherein the back-disk surface includes a central portion concentric with the axis-of-rotation, and wherein the back-disk surface includes a circumferential edge-channel insert from, and concentrically surrounding, the central portion.

2. The compressor wheel according to claim 1, wherein the surface-curve establishes a smooth transition from the concave curvature to the non-concave curvature at the inflection point.

3. The compressor wheel according to claim 1, wherein the surface-curve establishes a convex curvature from the inflection point to the exducer end.

4. The compressor wheel according to claim 1, wherein the hub forms a radially pointed tip at the exducer end.

5. The compressor wheel according to claim 1, wherein:

the back-disk surface includes a central portion concentric with the axis-of-rotation; and the back-disk surface includes a circumferential edge-channel inset from, and concentrically surrounding, the central portion.

6. The compressor wheel according to claim 5, wherein the edge-channel has a conical bottom that connects to the exducer end of the flow surface.

7. The compressor wheel according to claim 6, wherein the edge-channel has a side wall smoothly transitioning the conical bottom to an outer edge of the central portion.

8. The compressor wheel according to claim 6, wherein the hub forms a radially pointed tip at the exducer end.

9. The compressor wheel according to claim 6, wherein the hub forms an outer cylindrical surface at the exducer end.

10. A compressor, comprising:

a hub defining an axis-of-rotation, the hub forming a flow surface extending from an inducer end to an exducer end of the flow surface, the flow surface facing in a first axial direction, and the hub forming a back-disk surface facing in a second axial direction opposite the first axial direction, wherein the flow surface, taken meridionally, defines a surface-curve from the inducer end to the exducer end of the flow surface;

a plurality of impellers extending from the flow surface;

a housing configured to mount the compressor wheel for rotation within the housing and around the axis-of-rotation; and wherein the surface-curve establishes a concave curvature from the inducer end to an identifiable inflection point; and wherein the surface-curve smoothly transitions to and establishes a non-concave curvature from the inflection point to the exducer end;

wherein the back-disk surface includes a central portion concentric with the axis-of-rotation; and wherein the back-disk surface includes a circumferential edge-channel inset from, and concentrically surrounding, the central portion.

11. The compressor according to claim 10, wherein:

the housing forms a compressor wall normal to the axis-of-rotation;

the compressor wall forms a circular inset wall concentrically surrounding the axis-of-rotation, and an inner-diffuser wall concentrically surrounding the circular inset wall;

the circular inset wall is sized to receive the central-portion with a clearance gap therebetween;

the inner-diffuser wall extends radially outward from the circular inset wall; and the exducer end of the flow surface extends radially outward to be axially over an inner portion of the inner-diffuser wall.

12. The compressor according to claim 11, wherein:

the inner-diffuser wall forms a conical inset concentric with the axis-of-rotation and surrounding the circular inset wall, and the inner-diffuser is characterized by an inner-diffuser-wall conical angle;

the edge-channel has a conical bottom that connects to the exducer end of the flow surface, and the edge-channel is characterized by an edge-channel conical angle; and the inner-diffuser-wall conical angle matches the edge-channel conical angle and is conformingly spaced apart.

13. The compressor according to claim 12, wherein:
the inner-diffuser wall forms a conical inset concentric with the axis-of-rotation and surrounding the circular inset wall, and that is characterized by an inner-diffuser-wall conical angle;
the edge-channel has a conical bottom that connects to the exducer end of the flow surface, and that is characterized by an edge-channel conical angle; and
the inner-diffuser-wall conical angle matches the edge-channel conical angle and is conformingly spaced apart.

14. The compressor according to claim 13, wherein the hub forms a radially pointed tip at the exducer end.

15. The compressor according to claim 14, wherein:
the compressor wall forms an outer-diffuser wall concentrically surrounding the inner-diffuser wall;
the inner-diffuser wall forms a conical inset concentric with the axis-of-rotation and surrounding the circular inset wall, the inner-diffuser wall connecting the circular inset wall to the outer-diffuser wall; and
the outer-diffuser wall axially aligns with the inflection point of the flow surface.

16. A turbocharger, comprising:
a hub defining an axis-of-rotation, the hub forming a flow surface extending from an inducer end to an exducer end of the flow surface, the flow surface facing in a first axial direction, and the hub forming a back-disk surface facing in a second axial direction opposite the first axial direction, wherein the flow surface, taken meridionally, defines a surface-curve from the inducer end to the exducer end of the flow surface;
a plurality of impellers extending from the flow surface;
a housing configured to mount a compressor wheel for rotation within the housing and around the axis-of-rotation;
a turbine connected to drive the compressor wheel in rotation; and
wherein the surface-curve establishes a concave curvature from the inducer end to an identifiable inflection point;
wherein the surface-curve smoothly to and establishes a non-concave curvature from the inflection point to the exducer end;
wherein the back-disk surface includes a central portion concentric with the axis-of-rotation; and
wherein the back-disk surface includes a circumferential edge-channel inset from, and concentrically surrounding, the central portion.

17. The turbocharger according to claim 16, wherein:
the compressor wheel is configured to compress a fluid the compressor wheel comprises
a hub defining an axis-of-rotation, the hub forming a flow surface extending from an inducer end to an exducer end of the flow surface, the flow surface facing in a first axial direction, and the hub forming a back-disk surface facing in a second axial direction opposite the first axial direction, wherein the flow surface, taken meridionally, defines a surface-curve from the inducer end to the exducer end of the flow surface; and
a plurality of impellers extending from the flow surface; and
the surface-curve is configured to establish a concave curvature from the inducer end to an inflection point; and
the surface-curve is further configured to establish a non-concave curvature from the inflection point to the exducer end.

18. The turbocharger according to claim 17, wherein:
the back-disk surface includes a central portion concentric with the axis-of-rotation; and
wherein the back-disk surface includes a circumferential edge-channel inset from, and concentrically surrounding, the central portion.

19. The turbocharger according to claim 18, comprising:
a turbine connected to drive the compressor wheel in rotation;
wherein the housing forms a compressor wall normal to the axis-of-rotation;
wherein the compressor wall forms a circular inset wall concentrically surrounding the axis-of-rotation, and an inner-diffuser wall concentrically surrounding the circular inset wall;
wherein the circular inset wall is sized to receive the central-portion with a clearance gap therebetween;
wherein the inner-diffuser wall extends radially outward from the circular inset wall; and
wherein the exducer end of the flow surface extends radially outward to be axially over an inner portion of the inner-diffuser wall.

* * * * *